US012806872B2

(12) United States Patent
Schlemmer et al.

(10) Patent No.: US 12,806,872 B2
(45) Date of Patent: Nov. 24, 2026

(54) METHOD FOR PRODUCING A DECORATIVE ELEMENT HAVING A FUNCTIONAL OPENING AND DECORATIVE ELEMENT

(71) Applicant: Lisa Dräxlmaier GmbH, Vilsbiburg (DE)

(72) Inventors: Christian Schlemmer, Landshut (DE); Linda Paintner, Landshut (DE); Wolfgang Strasser, Aham (DE)

(73) Assignee: Lisa Dräxlmaier GmbH, Vilsbiburg (DE)

( * ) Notice: Subject to any disclaimer, the term of this patent is extended or adjusted under 35 U.S.C. 154(b) by 88 days.

(21) Appl. No.: 18/807,458

(22) Filed: Aug. 16, 2024

(65) Prior Publication Data

US 2024/0399683 A1 Dec. 5, 2024

Related U.S. Application Data

(63) Continuation of application No. PCT/EP2023/053011, filed on Feb. 7, 2023.

(30) Foreign Application Priority Data

Feb. 16, 2022 (DE) ..................... 10 2022 103 616.2

(51) Int. Cl.
*B29C 70/88* (2006.01)
*B32B 3/26* (2006.01)
*B29L 31/00* (2006.01)

(52) U.S. Cl.
CPC .............. *B29C 70/88* (2013.01); *B32B 3/266* (2013.01); *B29L 2031/722* (2013.01); *B32B 2451/00* (2013.01)

(58) Field of Classification Search
CPC ..... B29C 70/88; B32B 3/266; B32B 2451/00; B29L 2031/722
USPC .......................................................... 156/250
See application file for complete search history.

(56) References Cited

U.S. PATENT DOCUMENTS

| | | | | |
|---|---|---|---|---|
| 11,787,161 | B2 * | 10/2023 | Diehl | B32B 21/14 296/1.08 |
| 2004/0224131 | A1 | 11/2004 | Cowelchuk et al. | |
| 2013/0341817 | A1 | 12/2013 | Heffelbower | |

FOREIGN PATENT DOCUMENTS

| | | | |
|---|---|---|---|
| DE | 102011082344 | A1 | 3/2013 |
| DE | 102013202222 | A1 | 8/2014 |
| DE | 102017101981 | A1 | 8/2018 |

* cited by examiner

*Primary Examiner* — James D Sells
(74) *Attorney, Agent, or Firm* — Burris Law, PLLC

(57) ABSTRACT

A method for producing a decorative element and a decorative element with a functional opening, which is intended for a motor vehicle. In the method, a decorative blank which has a through opening and a functional coating is provided. A composite including the decorative blank and the functional coating is also produced by fixing the decorative blank to the functional layer via its fastening side. The through opening of the decorative blank is filled with a filling material, and the through opening is further developed into the functional opening.

16 Claims, 3 Drawing Sheets

METHOD FOR PRODUCING A DECORATIVE ELEMENT HAVING A FUNCTIONAL OPENING AND DECORATIVE ELEMENT

CROSS-REFERENCE TO RELATED APPLICATIONS

This application is a continuation of International Application No. PCT/EP2023/053011, filed on Feb. 7, 2023, which claims priority to and the benefit of DE 10 2022 103 616.2 filed on Feb. 16, 2022. The disclosure of each of the above referenced application is incorporated herein by reference.

FIELD

The present disclosure provides a production method for a decorative element that has one or more functional openings.

BACKGROUND

The statements in this section merely provide background information related to the present disclosure and may not constitute prior art.

It is currently very difficult to precisely align decorative cut-outs, especially flexible decorative cut-outs, with each other. In the context of serial production of decorative elements with one or more such decorative cut-outs, much effort is expended in order to achieve the repeated accuracy desired, such that there are gaps between the serially-produced decorative elements (for example between the decorative cut-outs) of the same quality. If such a decorative element also has one or more openings, it is particularly difficult to laminate the decorative element onto a carrier structure, since the opening or openings can lead to wrinkling and/or warping of the decorative element, particularly around the corresponding opening. For this reason, patterns that are particularly complicated and detailed and that incorporate the opening in their depictions on the decorative element are often not used. Furthermore, attaching the decorative element to the support structure has so far involved time-consuming positioning and fixing of the flexible decorative element or several such decorative elements that are partially opened by the opening or openings. However, this is not very efficient and leads to undesirably long cycle times in serial production for laminating the decorative element onto the carrier structure.

SUMMARY

This section provides a general summary of the disclosure and is not a comprehensive disclosure of its full scope or all of its features.

The function of the present disclosure is to produce, simply and efficiently, a decorative element that has at least one functional opening. The present disclosure also concerns a decorative element that is produced by using the method ascribed to the present disclosure. The decorative element is especially intended for use in the automotive sector, for example as a decorative interior element of a motor vehicle, in particular passenger cars and/or trucks. Possible applications of such a decorative element include illuminated/illuminable or backlit/backlighting symbols (warning symbols, status indicators, etc.), emblems (coats of arms, manufacturer symbols, logos, vehicle model and/or model series designations, etc.), functional decorations (interior or ambient lighting, button and/or switch surfaces, etc.).

As per the present disclosure, a method is provided for producing a decorative element which has at least one functional opening or more functional openings. The decorative element is intended for the interior of a motor vehicle, such as a passenger vehicle. The method as per the present disclosure is used for manufacturing, which means that the decorative element, as per the present disclosure, is a product which was/is manufactured via the method given by the present disclosure.

The respective functional opening is a functional opening by means of which or through which a motor vehicle function provides a functional effect to someone using the motor vehicle, such as a passenger. For example, the respective functional opening may be a light opening in order to provide the user of the motor vehicle with a light function, such as ambient lighting, a warning light, etc. Furthermore, the respective functional opening can be a sound opening in order to play a sound or a sound sequence, in particular an announcement, to the user, for example a warning sound or a warning announcement, a sound or an announcement from a vehicle infotainment system, etc. Other variants of functional openings are also conceivable, for example the use of such a functional opening as a ventilation opening in order to provide the user with an air-conditioned air flow through the ventilation opening.

The process for producing the decorative element has the steps described in more detail below, though they may be performed in a different order from the order described. Furthermore, the steps may at least partially overlap in time or at least partially take place simultaneously. In other words, the method's individual steps are described first; their sequence is determined in conjunction with the description of the possible manifestations. In one example, the sequence of the steps differs for each possible manifestation, respectively. In this respect, any order of steps used in the description may not indicate a sequence of steps, but primarily serves as a structured description.

The method's first step provides the step for making a decorative cut-out with a through holes. The method can outline the through hole that either completely or partially penetrates the decorative cut-out. Two or more such decorative cut-outs can be made. At least two decorative cut-outs can be arranged relative to one another in such a way that there is a gap between them, which then forms the through hole or another through hole. The respective decorative cut-out can be flexible, rigid or elastic—to be bendable in the opposite direction—and has a visible side and a fastening side, with these two sides spaced apart from one another by a material thickness of the decorative cut-out and with their surfaces normally opposite one another. The respective decorative cut-out is a particular flat product made of fabric, a textile-like material, leather and/or artificial leather. Furthermore, film foil structures or rigid structures (e.g. plates) may possibly be made of these or other materials, such as TPO (thermoplastic polyolefins) etc. Natural, renewable and/or synthetic leather substitutes (apple leather, mushroom leather, eucalyptus leather, pineapple leather etc.), hot-stamped or non-hot-stamped textiles, glass or imitation glass, metallic materials, ceramics, wood, plastics etc. can also be used as materials for the respective decorative cut-out. A material structure may also be made out of a mixed material that contains one or more of the materials mentioned previously, for example. If two or more decorative cut-outs are used, they can be made of the same or different materials. The respective material can be transparent or non-transparent, and/or permeable or non-permeable to acoustic waves.

Before, during or afterwards (e.g. as a second step in the process), a functional layer is prepared, which can be flexible, rigid or bendable in the opposite direction. The functional coating can have more than one functional layer. The functional coating has an attachment side and a back side, which are spaced apart from one another by the functional layer's material thickness and whose surfaces are normally opposite to one another. The functional layer's attachment side is designed to be temporarily (e.g. removable without causing damage) or permanently connected to the attachment side of the decorative cut-out. In particular, the functional layer is a fabric structure, a woven fabric, a knitted fabric, a braid, a stitched fabric, a fleece, a film layer, etc. Furthermore, the functional coating can have a foam and/or grid structure or be at least partially made of such a structure. The functional coating can be permeable to light, at least to light which is visible to a person with a physiological visual apparatus, and without additional aids. Such light has a wavelength of approximately 380 nm-780 nm (nanometers). In other words, the functional coating is permeable to visible light. For example, the light can filter through meshes or other material-free spaces (e.g. perforation openings, etc.) that the functional layer has. It can also be made such that the light filters directly through a functional coating material: through its threads, for example. In this case the functional coating is provided with a material that is either at least partially translucent or fully transparent. The functional coating may also have an electrical circuit carrier or may be made from such a carrier. The circuit carrier can be a flexible circuit board, for example. The circuit carrier can be embedded in the functional coating material. An electrical and/or electronic set-up of the decorative element can then be formed using the functional coating. The functional coating can be especially used as a laminating auxiliary layer, in which case the laminating ability of the decorative cut-out is increased solely by the functional layer. The decorative element is then laminated onto the carrier structure using the functional coating or by using the functional coating as a lamination layer. An additional soft layer, different from the functional coating, is arranged between the decorative element's functional layer and the carrier structure (e.g. a spacer fabric, a textile, etc. This soft coating can have an additional circuit carrier or an electrical and/or electronic component, in particular a light source, such as an LED, preferably an RGB LED, etc.

In the next (e.g. third) step of the process, a composite is produced which comprises the decorative cut-outs, or the decorative cut-outs and the functional coating. To this end, the (respective) decorative cut-out and the functional coating are affixed. For example, the decorative cut-out is affixed to the attachment side of the functional coating. The attachment or bond between the decorative cut and the functional layer can be designed in such a way that it can be released again without causing any damage. In other words: properly releasing or dissolving the bond/attachment between the decorative cut-out and the functional coating (e.g. to produce the decorative element) results in not damaging the decorative cut-out nor damaging the functional coating. This is because the process makes it such that the connection between the decorative cut-out and the functional coating may be released again, since the finished decorative cut-out does not have the functional coating. The functional coating can be removed: for example, if the decorative cut-out has been laminated onto a carrier structure. Alternatively, the bond or attachment between the decorative cut-out and the functional coating can be made permanent if the finished decorative cut-out has the functional coating. For example, the decorative cut-out's attachment sides and the functional layer are glued together. This means that an adhesive layer, or an adhesive, is provided in addition to the decorative cut-out and the functional coating (e.g. as the first step or another step in the process). As a result, when making the composite, the decorative cut-out and the functional coating are bonded together (e.g. material-on-material).

By filling the through hole with a filling material (such as a polymer, a hot melt, a dispersion, etc.), the functional hole is created using the through hole. If the functional hole is designed as a light hole (which can also be called an illumination hole or backlight hole), the functional hole is either completely or partially filled with the filling material. In the fully reacted state, the filling material is, for example, translucent, that is, permeable to visible light. A light hole is then formed from the functional hole by filling it with the filling material, which reacts to a fully reacted or hardened state in which it is at least partially translucent or at least partially transparent (e.g. image-true transparent). The filling material can, for example, have a milky appearance, similar to frosted glass. This results in a diffusely distributed light emerging from the filling material when the filling material is illuminated.

If the functional hole is designed as a sound hole, it is, at most, partially filled with the filling material. In this case, the filling material can be selected in such a way that it reacts to the fully reacted state in which the filling material is opaque or impervious to light. As a result, the functional hole is formed into a sound hole by (at most) partially filling it with the filling material, which then reacts to a fully reacted or hardened state in which it is opaque or impervious to light.

In any case, the filling material can be flexible, rigid or bendable in the opposite direction, as well as shaped such that it corresponds to the shape of the functional hole using non-cutting and/or machining manufacturing processes before being introduced into the functional hole. It is also possible that the filling material be converted into a liquid—or at least sticky paste—and then introduced into the functional hole in order to harden inside the functional hole. For the filling, the filling material can be rolled onto the attachment side of the functional coating using a transfer roller device, for example. On the one hand, the functional hole is filled with the filling material because it runs into the functional hole, especially if the filling material is applied to the attachment side of the functional coating in liquid/pasty form. On the other hand, the attachment side of the functional coating is coated with the filling material by rolling the filling material on, including away from the functional opening. In addition, the filling material can act as a connective element to seamlessly attach additional materials without any slits or gaps.

At least one portion of the decorative cut-out and at least one portion of the functional coating attached behind it are acoustically permeable (e.g. permeable to sound waves) after being filled with the filling material. To fill the acoustically permeable functional hole, it is covered on the attachment side with a cover element, so that the filling material does not flow into the functional hole at the point of the cover element when it is rolled on. The cover element is then removed after the other parts of the decorative cut-out have been filled. Furthermore, aside from functional holes, such a cover element can be used to inhibit the attachment side from being coated with the filling material. If the decorative cut-out is made of an acoustically permeable material, for example an acoustic textile, the acoustic permeability of the decorative cut is preserved. The parts of the decorative cut-out that are covered with the cover element when it is filled can be referred to as acoustically effective areas. This allows the decorative element having the decorative cut-out to function particularly efficiently as a decorative element for a loudspeaker placed behind it.

Before filling the functional hole or before coating the attachment side of the decorative cut-out, a flow path for the filling material along the attachment side may be partially limited, at least. Furthermore, a flow path for the filling material along a thickness of the decorative cut-out can be partially limited. For this purpose, the decorative cut-out or the composite of the decorative cut-out and the functional coating can be compacted in the acoustic area of effect (e.g. embossed or hot-stamped, etc.). The material compactions and/or material fusions achieved by compacting generate so-called flow barriers or flow barrier areas.

This process allows the decorative element to be manufactured particularly efficiently. On the other hand, the decorative element produced using the process is particularly easy to laminate and can therefore be laminated onto the carrier structure especially precisely, without distortion and without the forming wrinkles. The carrier structure is an injection-molded carrier which is coated with a layer of a soft component (e.g. a textile, a spacer fabric, a foam, etc.) or at least partially includes a soft component. The decorative element can be laminated onto this layer particularly easily using soft lamination. Alternatively, the carrier structure can be designed to be dimensionally stable or at least have a dimensionally stable surface. The decorative element can be laminated onto the dimensionally stable carrier structure particularly easily using hard lamination (e.g. without the soft component layer).

This is due to the decorative cut-out being stabilized during lamination by the functional coating, which serves as a supportive element. The functional holes—even if they are particularly delicate (e.g. only a few millimeters or less than a millimeter wide)—do not become deformed in any unintended way. This results in a particularly high lamination quality, the advantage of which is that it can be maintained at a consistently high level within a production series. As a result, time-consuming positioning of the decorative element on the support structure and removing undesirable deformations/wrinkles when lamination of the decorative element is also no longer performed may be omitted. This facilitates the easy and efficient production of complicated or complex designs. This also results in a particularly high level of reproducibility, which in turn results in less waste, which means that the decorative element can be produced in a resource-efficient way.

The method is advantageous in producing, for example, a decorative element without an air gap, such that illuminated or backlit symbols and/or other flat structures can be integrated into the interior of the motor vehicle. In addition, another advantage is found in the closed surface that the decorative element has, since this means that no liquids, dirt, etc. can accidentally pass through the functional hole to the functional coating's attachment side. Furthermore, there are no open gaps where liquids or dirt could collect, which, if this were to happen, would then be difficult to remove. This means that decorative element's surface can be cleaned or polished relatively efficiently. The freedom of design is almost limitless; meandering, straight, framed, partially circumferential, interlocking, net-like, puzzle-like, linked, island-shaped, branched, dashed-line-like, perforated, interrupted, continuous, constant or varying widths, overlapping, three-dimensional lighting structures and/or combinations thereof are possible. A functional body can be illuminated by means of such a lighting structure and/or light can be set into a functional body. One or more electrical and/or electronic components can be used in this functional body (e.g. sensors—radar, ultrasound, camera, etc.), elements of passive and/or active security systems, acoustic elements (e.g. loudspeakers, microphones, etc.), lighting elements (e.g. interior lighting, ambient lighting, etc.), user-interactive elements (e.g. displays, buttons, switches, etc.). This means that the functional body can form a housing for one or more of the aforementioned components.

In addition, the method can be used to produce the decorative element, the outer surface of which is formed partly by the visible side of the decorative cut-out and partly by the functional coating's attachment side. This means that, on one hand, a visible side of the decorative element is formed by the visible side of the decorative cut-out and on the other hand by the attachment side of the functional coating, which is at least partially or fully exposed, in such a way that an observer can see the visible side of the decorative cut-out while also seeing the exposed area of the functional layer's attachment side. To this end, the through-hole, or the functional hole, of the decorative cut-out can have a certain shape (e.g. a character, another symbol, or letter(s)). Other options include company logos, imitation seams, etc.

In an additional example of this method, the decorative cut-out is produced using two or more cut material parts, that is, a first cut material part and at least one second cut material part. The (respective) decorative cut-out is formed from the cut material parts. This works analogously with two decorative cut-outs, as already described above. In any event, the through hole is formed by a gap between the cut material parts or between the decorative cut-outs. For example, the first cut material part or the first decorative cut-out has a first edge, whereby the second cut material part or the second decorative cut has a second edge. The edges are spaced apart from one another across the gap by fixing the cut material parts or decorative cuts together to the same functional layer. The first and second cut material parts/decorative cut-outs are then spaced apart from one another across the gap. In particular, the cut material parts are laid or aligned in such a way that the above-mentioned lighting structure is made possible.

The gap that gives form to the through hole is then filled with the filling material, such that the gap is then further processed into the functional opening, thus turning it into a functional gap. The gap, which can also be referred to as an elongated hole, functions (at least before filling) as a positioning aid when positioning the decorative element's electrical and/or electronic apparatus. This could be, for example, a light-guiding element, a light source, a sensor, etc. By filling the gap with the filling material, the cut material parts are securely affixed to one another, either at their edges or edge surfaces. In order to further support a particularly secure connection of the cut material parts, a connecting element in the shape of the letter T is arranged on the edges, which is enclosed by the packing in the filling material.

Alternatively (or additionally), in another example of the method, the through hole is cut into the first cut material part. For example, the through hole is an oval, elliptical or circular hole, a polygonal hole or a hole of any other shape. The second cut material portion and the hole or through hole are produced in such a way that their size and geometry match. The second cut material portion is inserted into the through hole, whereby an area that has no cut material parts (e.g. an annular gap) is formed between an edge of the second cut material portion and the through hole. This means that the through hole is partially filled by the second cut material part. The two cut material parts are then affixed to each another using a glue, while the through hole is filled with the filling material. The method can be used to create complex design decorative elements, which, among others, have seamless translucent structures (e.g. in the shape of characters Q, R, O, P, A, D, B, 4, 6, 8, 9, 0), as well as any other shape that has at least one self-contained/endless contour section that demarcates an inner area. A seamless translucent structure can also be formed on an edge of the decorative element, the inner area of which is delimited by a contour section and by an edge of the corresponding cut material portion, for example in the form of the character U, the legs of which end with/at the edge.

Another possible example of the method is produced by filling the through hole with the filling material. The decorative cut-out and the functional coating are glued together in a single step. This means that separate process steps in which the through hole is first filled and then where the decorative cut-out is connected to the functional coating (or vice versa) are eliminated. This is advantageous because, among other things, the short cycle time to produce the decorative element is short. In order to fill the through hole with the filling material, the method generally and specifically in this example has the filling material to be used for the through hole is in a pasty, or liquid, state. This creates a material bond between the decorative cut-out(s) and the filling material during filling, or while filling the through hole. The filling material, which is introduced into the through hole and hardens there, creates a material-tight connection between the decorative cut-out(s) and between the respective decorative cut-out and the functional coating. This is the permanent or non-destructively removable fixation or connection between the (respective) decorative cut and the functional coating and/or between the functional opening filled with the filling material and the functional coating.

The filling material should at least have adhesive properties of an adhesive. If the filling material is used as a means for creating a material-tight connection between decorative elements, between cut material parts, between a decorative element and the functional coating and/or between a cut material part and the functional coating, it has the adhesive properties of an adhesive. Accordingly, an adhesive can be used as the filling material. The adhesive filling material or the filling material that creates an adhesive connection results in a particularly stable structure for the decorative element. After the filling material has reacted, there are no areas on the visible side of the decorative cut-out, e.g. on the decorative element's visible side, nor its reverse side (e.g. on the attachment side of the functional layer) where a user of the decorative element, such as a fitter who is assembling the decorative element, can accidentally become stuck. On the contrary: the result is a particularly pleasing and tactile surface, even in areas where the filling material forms part of the decorative element's exterior surface.

Another possible example of the method provides for a multi-layer functional coating. As such, the functional coating has a first functional layer and at least one second functional layer, or more than two such functional layers. The functional coating is therefore fabricated from or produced by creating the first functional layer and, at least, the second functional layer. In this case, the composite of the decorative cut-out and the functional coating is produced by affixing the functional layers and the decorative cut-out to one another. The decorative cut-out may be arranged between functional coating's two functional layers. Accordingly, at least one of the functional layers can be attached to the decorative cut-out's visible side, e.g. as a protective layer to further handle and/or process the decorative cut-out. In addition, it is possible to have at least two of the functional layers connected to one another in stacks (e.g. glued to each another), thereby partially forming the functional layer, at a minimum. The individual functional layers have different functionalities or intended uses and/or are made from different or various materials. For example, one of the functional layers can be designed as the circuit carrier or have a circuit carrier, whereas another of the functional layers is sprayed onto the decorative cut-out's visible side as a protective varnish. Due to the functional coating's multiple layers, the process can be adapted particularly efficiently to changing or modified boundary conditions. This means that the process can be used advantageously to produce different variants of a decorative element. The process is therefore particularly versatile and flexible.

Furthermore, the method allows for the electrical and/or electronic arrangement of the decorative element to be attached in a carrier area of the functional coating, corresponding to the through hole of the decorative cut-out. This means that the through hole and the carrier area are positioned in such a way that the carrier area electrical and/or electronic arrangement can be used in the through hole and/or through the through hole. For this purpose, the through hole is arranged in relation to the carrier area and/or the carrier area is identified or selected in relation to the through hole. In general, the electrical and/or electronic arrangement has, for example, at least one light source, at least one light-guiding element, at least one light-guiding element equipped with a light source, a sensor system, a heating device, etc. The electrical and/or electronic arrangement gives the decorative element, specifically its functional opening(s), a functionality that is made available to the user of the motor vehicle in the interior. For example, a lighting function can be integrated directly into the decorative element, eliminating the need to mount the light source separately from the decorative element.

In an additional possible example of the method, at least part of the functional coating, e.g. at least one of the functional layers, is removed from the decorative blank after the through hole has been filled. Accordingly, the functional coating (or at least one of the functional layers) can be a so-called sacrificial layer, which is used to produce the decorative element, but is not itself a component of the decorative element. In other words, the functional coating is completely or partially removed from the decorative blank to produce the decorative element. Nevertheless, the functional coating serves, for example, as the support element and/or as a positioning aid for the blank material portions when fabricating the decorative element. At least one of the functional layers can act as a sealing element during filling with the filling material in order to inhibit filling material from inadvertently flowing onto the visible side and thereby soiling or damaging it. The process is particularly environmentally friendly, as the functional layer or ply removed from the decorative cut-out is reused, e.g. used to produce more than one decorative element. This has the benefit that it results in a particularly thin decorative element that fits particularly tightly to the support structure.

In connection with the through hole of the functional coating, it is also possible for an inner part of the functional coating to be completely surrounded by an outer part of the functional coating, with a gap between the inner and outer parts of the functional layer forming the through hole of the functional coating. In this case—for example in order to provide high stability of the through hole of the functional layer—a webbing having at least one web can traverse or bridge the gap so that the inner and outer parts of the functional coating are connected to one another by means of the webbed apparatus. One web can be used as a design element, for example by selecting and inserting a transparent or, at the very least, translucent filling material. The webbing is then visible or recognizable through the filling material. This effect can be further increased if the webbing has a different color (e.g. a particularly contrastive or striking color) than the visible side of the decorative cut. Alternatively or additionally, one or more of the webs of the webbing apparatus can be designed in such a way, by, for example, using a corresponding geometry and/or a corresponding choice of material—that it remains largely invisible when backlit, e.g. is only vaguely visible or recognizable. In one example, at least one of the functional layers has such connecting webs.

The method has proven to be very efficient, particularly in the case of several elongated, e.g. slot-like functional openings lying next to one another, which are connected to each other via the thin or filigree webbing. This is because the filling material keeps the filigree webbing in the exact position. This results in a particularly regular functional opening after lamination, as the edges of the elongated functional opening are inhibited from being pulled apart, which would be possible with a functional opening that is completely free of filling material due to the associated instability.

By forming the through hole that functions as the filling opening, the functional layer is designed to be fluid-permeable at least in the area of the filling opening. In one example, it is provided that a material from which the functional layer is made is fluid-permeable. This means that a liquid (such as water, the pasty filling material, etc.) can flow through the functional coating material. In this case, for example, it is possible to bond the functional coating and the decorative cut-out particularly tightly, thereby making the decorative element very stable. To do this, the filling material is introduced from the back of the functional coating into the corresponding through hole of the decorative cut-out by oversaturating the functional coating with the filling material so that the filling material flows through the functional coating in the direction of the visible side of the decorative cut. The filling material then flows out of the functional layer into the through hole, creating the functional opening. So much liquid/pasty filling material is brought into direct contact with the back of the functional layer that it soaks up the filling material and is subsequently saturated, filled, at least in the area of the through hole of the decorative cut. This means that the filling material flows through the functional coating or through its material into the functional opening. After flowing into the through hole, the filling material reacts, either passively or by adding an activator or hardener, or to heat or other radiation, such as ultraviolet light, etc. In the fully reacted state, the filling material is, for example, hardened and translucent and/or transparent. In this case, the term "hardened" does not mean that the filling material is rigid or brittle in the fully reacted state; rather, "hardened" is to be understood here as meaning that no relevant increase in strength is to be expected under normal conditions. Accordingly, the filling material can be flexible in its fully hardened state. In particular, the filling material is selected so that it corresponds to or at least comes close to the decorative cut in terms of bendability, stability, etc. The respective volumes of the filling material before and after filling the corresponding functional opening can differ due to shrinkage effects, for example due to evaporation of some of the filling material.

In an additional example of the method, the functional coating is partially translucent, at the very least, or image-true transparent. The functional coating or at least one of the functional layers that are part of the finished decorative element can be translucent with light. Accordingly, a light-conducting or light-directing part of the decorative element can be formed using the translucent/transparent functional layer. It is also conceivable that the entire decorative element is made translucent or transparent in order to allow the user of the motor vehicle to see behind the decorative element. For design reasons or for the purpose of a visual inspection or control, an element of the motor vehicle can be covered transparently using the decorative element.

The electrical and/or electronic arrangement of the decorative element is particularly safe or reliable and can be attached to the decorative element particularly easily when it is being manufactured if—as given in an additional use case—a fastening element for the electrical arrangement of the decorative element is formed on the attachment side of the decorative cut-out. The fastening element can be formed as part of the decorative cut-out or as part of the functional layer. For example, a pocket can be formed on one side, in particular the attachment side, of the decorative cut-out, which branches off from the through hole or opens into it. The pocket corresponds to a fastening tab of the electronic apparatus, with the electronic apparatus being arranged in such a way that its fastening tab engages in the pocket. The fastening tab can be fastened in the pocket, for example by filling the through hole with the filling material, a portion of the filling material flowing into the pocket with the fastening tab arranged therein. The fastening tab in the pocket is thus surrounded by the filling material and is thereby fastened in/on the pocket and consequently to the decorative cut-out.

A further possible example of the method provides for the formation of a spacer device with one or more spacer elements between the functional coating's attachment side and the attachment side of the decorative cut-out. The decorative cut-out and the functional coating are spaced apart using the spacer device, which has one or more spacer elements. The spacer device can be an element formed separately from the decorative cut-out and the functional coating. It is equally possible for the spacer device to be part of the functional coating and/or that the spacer device is part of the decorative cut-out. The spacer device and the decorative cut-out or the spacer device and the functional layer can be formed in one piece with one another. The spacer device extends between the attachment side of the decorative cut-out and the attachment side of the functional coating, with the distance between the attachments sides being given by a height of the spacer device. This has the benefit that, for example, a space is created between the attachment sides for the electrical arrangement of the decorative element. If, for example, the decorative element is to be designed as a heating element (e.g. for seat heating or similar), the electrical arrangement of the decorative element has heating elements, such as heating wires and associated electrical contacting elements. These heating wires can be integrated into the decorative element in a particularly efficient manner by placing them in the space between the fastening sides. Furthermore, the distance between the functional layer and the decorative cut-out can serve as an air guiding element, for example as an air guiding channel, which is particularly advantageous with regard to a decorative element that becomes part of an air conditioning system in the motor vehicle. In this way, air guiding elements that use very little installation space can be integrated particularly unobtrusively into the motor vehicle, in particular into its interior.

Furthermore, functional elements, for example air guiding elements, light guiding elements, decorative elements (e.g. with a metal, piano lacquer, glass look, etc.) can be positioned on the gaps of the decorative cuts or on the through-openings in such a way that the gaps/through-openings are joined or materially connected to the functional elements by filling and the associated flooding of the functional layer. This can be done with one or more spacers, or without spacers.

The electrical or electronic arrangement has—as already explained above—for example a light source, in particular at least one light source and/or at least one light guiding element. Furthermore, the electrical/electronic arrangement can have a circuit which can be formed from electrical line elements (such as cables, wires, conductively coated threads, printed conductor tracks, etc.) and a voltage source for supplying energy to the light source. In addition, the arrangement can have a control unit, specifically to control the light source in such a way that a special light effect or several different light effects can be generated by means of the light source. Such a light effect is, for example, a regularly or irregularly recurring glow and/or flashing of the light source, e.g. its illuminant. In this way, for example, a so-called running light can be realized. The at least one component of the electrical/electronic arrangement is, in one example, particularly small; for example, an LED carrier can be designed in the form of a sewable sequin.

The electrical or electronic apparatus can, for example, be sewn onto the functional layer. The functional layer can serve as a light reflector or as a light diffuser. The filling material itself, with which the corresponding gap or the corresponding functional opening is filled, can also function as a light guide/light diffuser. This means that the filling material can be backlit or illuminated using another light source as an alternative or in addition to the electrical arrangement. This can create particularly striking lighting effects by having a light effect generated by the electrical arrangement and another light effect generated by the other light source overlap or alternate regularly or irregularly. One of the lighting effects can be a static light.

In addition, the functional layer takes on a temperature protection function for electronic components that become part of the decorative element, such as the electronic arrangement, the second light source, other lamps, other consumers, etc., at least while the electronic components are being cast in/encased with the filling material. The functional coating therefore functions at least partially as a heat shield or heat dissipator when filled with the hot filling material, whereby electronic components of the decorative element—particularly temperature-sensitive ones—are particularly reliably protected against damage by the filling material.

Lamps forming part of the electrical/electronic apparatus (especially LEDs) could be fixed in position directly (under the through opening or functional opening to be filled) or indirectly (next to the through opening or functional opening to be filled) using the filling material. The respective LED can be fully or partially embedded in the functional opening. It can be provided that its LED surface is flush with the visible side of the decorative cut-out. A sacrificial layer of the functional layer, already described above, can be used when filling the respective through-opening in which the electrical and/or electronic arrangement is at least partially arranged, in order to seal the LED surface flush with the visible side so that no filling material gets onto the LED surface.

The functional layer can also serve as a spacer or positioning aid for aligning the LED in relation to the functional opening and/or in relation to the visible side of the decorative cut. The through hole is, for example, spanned with the functional coating or the functional coating is modified at least in one area to shape it into loops, folds, knobs, etc. The electrical arrangement is at least partially attached to the modified area, e.g. to the loops, folds and/or knobs. The deformation area, which then, at least partially, has the electrical/electronic apparatus, is then placed in the functional openings. The through hole of the functional layer and/or the through hole of the decorative cut serve as (respective) positioning and fixing aids for the functional coating (on which deformations and/or separate spacers are arranged, for example grids, profiles, etc.). Alternatively, spacer or positioning aids made of a separate material can be attached to the functional layer.

Another possibility for outfitting the functional coating with the electrical and/or electronic apparatus is to attach at least a portion of that apparatus, in particular the light source or the illuminant(s) (e.g. the LED(s)), or the entire apparatus to the back of the functional coating. In any case, the illuminant arranged on the back of the functional coating is not recognizable to the viewer if it is not switched to a lighting mode. In this case, the functional coating covering the illuminant functions as a light scattering element or light diffuser. The spacer elements of the spacer device can at least partially dip or protrude into the through or functional openings of the decorative cut-out.

As per yet another example of the method, a holding element is arranged on the attachment side of the functional layer, which dips into the through hole of the decorative cut-out and by means of which an electrical and/or electronic arrangement of the decorative element is held in the through opening. The holding element can, for example, be an integral component of the functional layer. Alternatively, the holding element can be an element formed separately from the functional coating. The holding element can be at least partially immersed in the through hole or completely immersed in the through hole. The holding element can also form at least part of the visible side of the decorative cut. The holding element can be used to hold at least part of the electrical and/or electronic arrangement or another such arrangement particularly securely in the through-opening, in particular at a desired height/depth of the through hole.

The present disclosure also involves a decorative element that is or was manufactured using a method performed in accordance with the above description.

The decorative element can, in general, be laminated onto the dimensionally stable support structure by means of hard lamination, or directly. The decorative element can also be laminated onto the support structure by means of soft lamination, that is, by using an intermediate layer between the decorative element and the dimensionally stable support structure. The intermediate layer can be a flat textile or a spacer textile. Fleece and/or foam structures are possible. The intermediate layer can be translucent or transparent, or image-true transparent, or light-tight, in whole or in part. The intermediate layer can also be a light source or have a light source. For example, one or more lamps and/or one or more light guides can be embedded in the material of the intermediate layer or incorporated in another way, attached to an outer surface of the intermediate layer, etc.

Further advantages, features and details of the present disclosure can be found in the following description of possible example and from the drawings. The features and combinations of features mentioned above in the description as well as the features and combinations of features shown below in the description of the figures and/or in the figures alone can be used not only in the combination specified in each case, but also in other combinations or on their own, without departing from the scope of the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
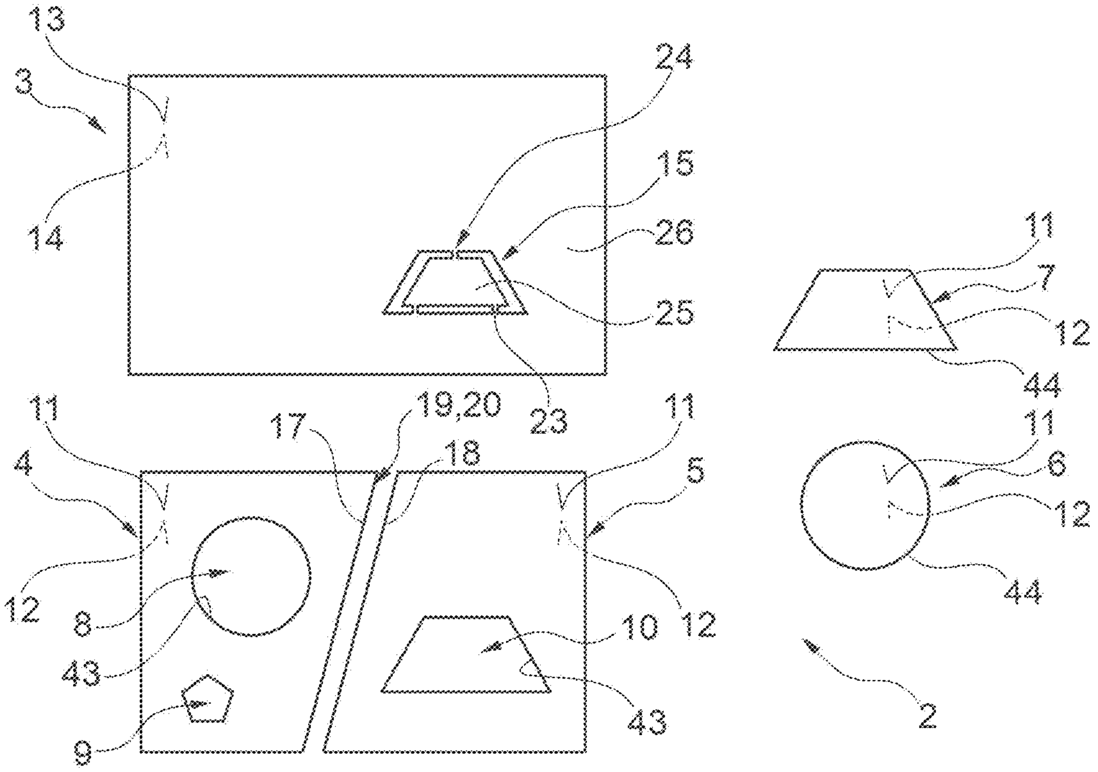
FIG. 1 is a schematic view of a decorative cut and a functional coating, wherein the respective decorative cut-out has a through hole according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features and Identical and functionally identical elements are provided with the same reference numerals in the figures.

In the following, a method for producing a decorative element 1 (shown for the first time in FIG. 2) and the decorative element 1 itself are presented in a joint description. FIG. 1 shows a schematic view of a decorative cut-out 2 and a functional coating 3. The decorative cut-out 2 and the functional coating 3 are provided or produced in a first step of the method. In the present case, the decorative cut-out 2 has several cut material parts 4, 5, 6, 7. In the process, the decorative cut-out 2 is therefore composed of the cut material parts 4, 5, 6, 7. The decorative cut-out 2 has a through hole 8, 9, 10, whereby the through holes 8, 9 are part of the first cut material portion 4 and the through hole 9 is part of the cut material portion 5. In contrast, the cut material portions 6, 7 are free of a through hole. The respective geometric shape of the through holes 8, 9, 10 and of the decorative cut-out 2 and the functional layer 3 is to be understood as merely exemplary. The decorative cut-out 2 has a visible side 11 and an attachment side 12, which are spaced out by a thickness of the decorative cut-out 2 or the cut material portions 4, 5, 6, 7 and are opposite one another.

The functional coating 3 has an attachment side 13 and a rear side 14, which are spaced apart by a thickness of the functional coating 3 and are opposite one another. In the present example, the functional attachment 3 is provided with a through hole 15, for example by cutting the through hole 15 into the functional coating 3. The through hole 15 can completely penetrate the functional layer 3. The through hole 15 is formed in/on the functional coating 3 in such a way that it corresponds to one of the through holes 8, 9, 10—in this case with the through hole 10—of the decorative cut-out 2. It can also be seen that a web arrangement 24 having at least one web 23 can pass through the through hole 15 of the functional coating 3, so that an inner portion 25 and an outer portion 26 of the functional coating 3 are connected to one another by means of the web arrangement 24. The functional coating 3 is further designed to be fluid-permeable in some areas or over its entire surface. In addition, the functional coating 3 is translucent in some areas or over its entire surface, transparent and true-to-image.

By carrying out further steps of the method, at least the decorative cut-out 2 is formed. Since the decorative cut-out 2 or is formed from it, the cut material parts 4, 5, 6, 7 are further processed to form the decorative element 1. For this purpose, a composite 16 is produced, which is shown in a schematic view in FIG. 2 and has the cut material parts 4, 5, 6, 7, i.e. the decorative cut-out 2, and the functional layer 3. The composite 16 is produced by fixing cut material parts 4, 5, 6, 7 via their fastening side 12 to the fastening side 13 of the functional coating 3. In this case, a gap 19 is formed between edges 17, 18 of the cut material parts 4, 5, which represents a further through coating 20 of the decorative cut-out 2. The cut material parts 4, 5 are therefore spaced apart from one another on the fastening side 13 of the functional layer 3 via the gap 19, e.g. via the through hole 20.

Figure 2:
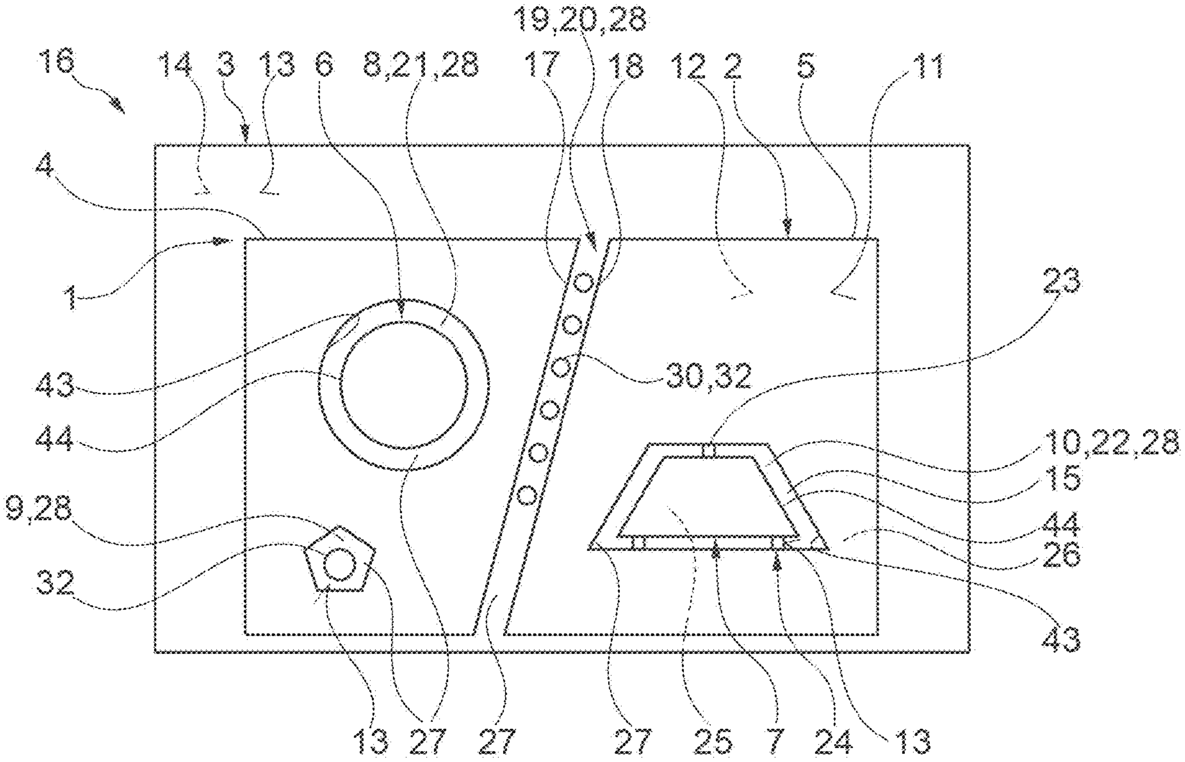
FIG. 2 is a schematic view of a decorative element or a composite of the decorative cut-out and the functional coating, which is formed from the decorative cut-out and the functional coating according to the present disclosure.

As can be seen from a comparison of FIG. 1 with FIG. 2, in the present case the cut material parts 6, 7 are inserted into the associated through holes 8, 10 to produce the composite 16, so that the respective through hole 8, 10 is partially filled by the corresponding cut material part 6, 7. In this case, a respective annular gap 21, 22 is formed between the cut material parts 6, 7 and the cut material parts 4, 5, which is free of a material of the cut material parts 4, 5, 6, 7. The corresponding through hole 8, 10 is thus partially occupied or filled by the associated cut material portion 6, 7.

In principle, the edges of the functional coating 3, such as edges of the through coating 15 or outer edges, can be used to position the cut material portions 6, 7 as desired. For example, the edges, such as outer edges, of the cut material portions 6, 7 can be aligned precisely with the associated edges of the functional layer, with the edges then lying flush on top of one another. Alternatively, an oversize or undersize can be specified, by which the corresponding edge of at least one of the cut material portions 6, 7 is spaced from the associated edge of the functional coating in at least one edge section. The corresponding cut material portion 6, 7 can then protrude beyond the functional layer 3 at the edge or vice versa. In the event that an edge of the cut material portion 6, 7 or an edge of the functional layer 3 has an uneven, for example wave-like, course, the wave troughs or wave crests can be used as the decisive element for the alignment. Alignment via a laser projection is also a possibility.

The method also uses a filling material 27 with which at least one of the through holes 8, 9, 10, 20 of the decorative blank or decorative cut-out 2 is completely or partially filled or filled. By filling the respective through hole 8, 9, 10, 20, the corresponding through holes 8, 9, 10, 20 is further developed into a functional opening 28. In the present example, the filling material for filling the through holes 8, 9, 10, 20 is brought into an at least pasty, in this case at least approximately liquid, state or is already provided in this state. This means that when the through holes 8, 9, 10, 20 are filled, a material-locking connection is produced at least between the decorative blank or decorative cut-out 2 and the filling material 27. As a result, the composite 16 is stabilized or reinforced by filling it with the filling material 27. The filling material 27 has the adhesive properties of an adhesive or is an adhesive. Furthermore, the filling material 27 is translucent in its fully reacted state, e.g. permeable to visible light. In order to achieve a diffuse light distribution or light appearance on the visible side 11, in the present example it is provided that the filling material 27 is milky in the fully reacted state. By filling the corresponding one of the through holes 8, 9, 10, 20 with the filling material 27, a light opening 29 (see FIG. 3) is at least partially formed from it. For filling the through openings 8, 9, 10, 20, a coating process (such as a doctor blade and/or screen printing process), a reaction injection molding process (RIM), in particular a clear RIM process with transparent polyurethane, a roller coating process or transfer roller process with hot melt, a casting process and/or a casting process, in particular a low-pressure injection molding process, with a hot melt adhesive are used.

In the present case, it is also provided that the functional coating 3 and the decorative cut-out 2 are glued together while filling the through holes 8, 9, 10, 20 or one or some of the through holes 8, 9, 10, 20 with the filling material 27. The filling material 27 acts as an adhesive between the decorative cut-out 2 and the functional coating 3. Thus, in an advantageous manner, the (respective) through hole 8, 9, 10, 20 is filled with the filling material 27 and the functional coating 3 and the decorative cut-out 2 are glued together using just one single, common step in the work process. At least one portion of the filling material 27 penetrates from the corresponding through holes 8, 9, 10, 20 between the functional coating 3 and the decorative cut-out 2 and connects the functional coating 3 and the decorative cut-out 2 at their attachment sides 12, 13 in a material-locking manner.

FIG. 2 also shows an electrical and/or electronic arrangement 30, which can have, for example, a sensor system (image, air pressure, temperature sensor, etc.), a heating or air conditioning device 31 (see FIG. 3), etc. In particular, the arrangement 30 here has a lighting device 32, which in turn has a light source, a light guide, light-directing elements, etc. A last element of the lighting device 32 in the direction of light can be formed, for example, by the translucent or transparent filling material 27, which is backlit during operation so that the light from the light source shines out of the filling material 27. Furthermore, the lighting device 32 can be fully or partially embedded in the filling material 27 as a core light, light guide or light source, with the light then at least partially radiating out of the filling material 27.

Figure 3:
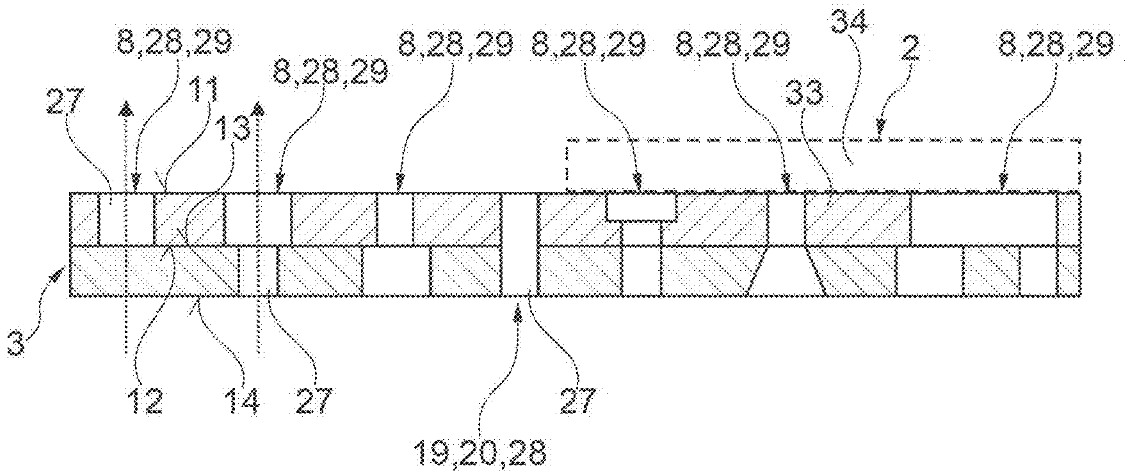
FIG. 3 is a schematic and sectional view of a composite of the decorative cut-out and the functional coating, showing different through holes according to the present disclosure.

FIG. 3 shows a schematic and sectional view of the composite 16 made up of the decorative cut-out 2 and the functional coating 3, wherein different variants of the through holes 8, 9, 10, 20 are shown using the example of the through holes 8, 20. It can be seen that the through holes 8 of the decorative cut-out 2 and the through hole 15 of the functional coating 3 can at least partially overlap one another, wherein the through holes 8, 15 can differ from one another in terms of geometry and size. In addition, through holes 15 are conceivable in the functional coating which are covered by the decorative cut-out 2, i.e. by one or more of the cut material parts 4, 5, 6, 7. Furthermore, it can be seen (on the far left) that a through hole 15 of the functional coating 3 may not be assigned to a through hole 8 of the decorative cut-out 2. Because—as already stated above—the material of the functional coating 3 can be permeable to visible light (indicated in FIG. 3 by dotted arrows).

In FIG. 3, a use of the functional coating 3 can also be seen, which is or will be formed from a first functional coating 33 and at least one further/second functional coating 34. The functional coating 3 may not be formed in stacks from the functional coatings 33, 34; because it is conceivable that one of the functional coatings 33, 34 is attached or fixed to the visible side 11 of the decorative blank 2, so that the functional coatings 33, 34 are spaced apart from one another in the process via the strength/thickness of the decorative blank 2. The functional coating 3 can be removed from the composite 16 to produce the decorative element 1—in particular after filling the through holes 8, 9, 10, 20—so that the decorative element 1 no longer has the functional coating 3 or no longer has it completely. It can serve, for example, as a protective element for the visible side 11 and/or as a sealing layer to inhibit the filling material 27 from reaching the visible side 11 when one or more of the through openings 8, 9, 10, 15, 20 are filled. For this purpose, the functional layer 34 can be attached to the visible side 11, for example glued, until the filling material 27 has hardened to such an extent that it is no longer sufficiently flowable to flow onto the visible side 11. This means that, for example, one of the functional coatings 33, 34, two or more of the functional coatings 33, 34 or all of the functional layers 33, 34 can be removed from the composite 16 in order to produce the decorative element 1. In this respect, the connection between the decorative cut-out 2 and the functional layer 3 or the functional coatings 33, 34 is a non-destructively removable fixation, such as a removable adhesive connection or similar. The (respective) functional coating 33, 34 that was removed from the composite 16 can be reused in a new run of the process, e.g. to produce another decorative element 1 in an ecologically favorable manner. In the present case, it is provided that the decorative element 1 has the functional coating 3, e.g. this is not completely removed from the composite 16.

Figure 4:
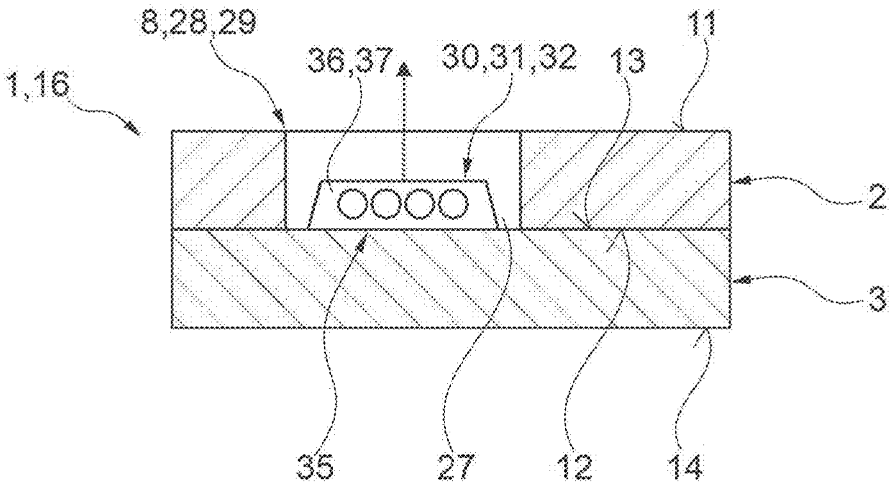
FIG. 4 is a schematic and sectional view of the decorative element, wherein an electrical and/or electronic apparatus of the decorative element is attached in a carrier region of the functional coating according to the present disclosure.

FIG. 4 shows a schematic and sectional view of the decorative element 1 or the composite 16 from which the decorative element 1 is made, wherein the electrical and/or electronic arrangement 30 of the decorative element 1 is/is fastened in a carrier region 35 of the functional layer 3. The carrier region 35 and the through hole 10, which—filled with the filling material 27—is the light opening 29, are aligned with each another such that the electronic arrangement 30, in particular its light device 32, can have an effect in the light opening 29 and/or through the light opening 29. In other words: the light emerging from the light device 32 (indicated in FIG. 4 by the dotted arrow) filters through the light opening 29, e.g. through the filling material 27, and radiates out of the decorative element 1 on the visible side 11 of the decorative cut-out 2. The situation is analogous if the arrangement 30 has the heating or air conditioning device 31 as an alternative or in addition to the lighting device 32: in this case, the dotted arrow represents a heat radiation or an air-conditioned air flow that exits from the heating/air conditioning device 31, enters the functional opening 28 and then exits from the decorative element 1 on the visible side 11 of the decorative cut-out 2. Accordingly, the arrangement 30 can have a lighting means 36 (e.g. a light source, a light guide element, etc.) and/or a heating/air conditioning means 37 (e.g. an air flow channel, a heating wire, etc.).

Figure 5:
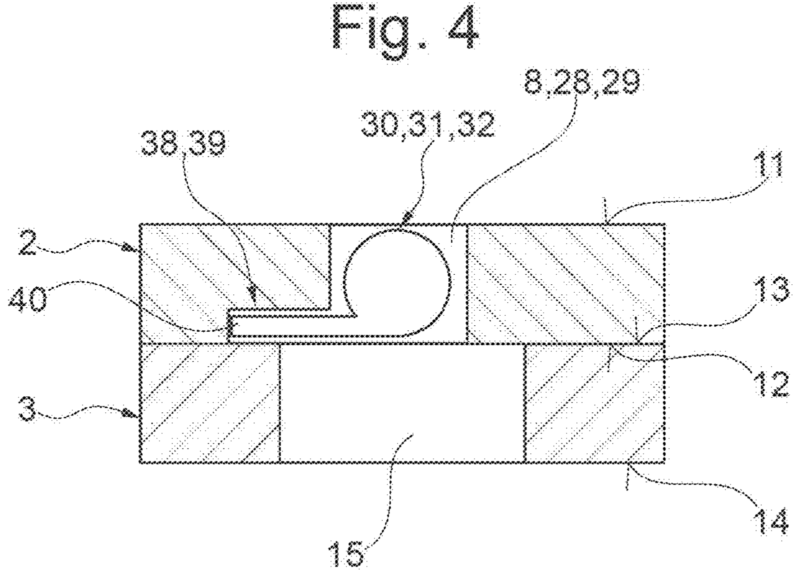
FIG. 5 is a schematic and sectional view of the decorative element having a fastening element for the electrical and/or electronic apparatus according to the present disclosure.

FIG. 5 shows a schematic and sectional view of the decorative element 1, which has a fastening element 38 for the arrangement 30. When producing the decorative element 1, the arrangement 30 and the decorative cut-out 2 and/or the functional coating 3 are fastened to one another by means of the attachment element 38. In the present case, the attachment element 38 has a first fastening unit in the form of a pocket 39, which branches off from the through hole 8, 9, 10, 20 of the decorative cut-out 2. Alternatively or additionally, the fastening element 38 has a further fastening unit (not shown) which branches off from the through hole 15 of the functional layer 3. Furthermore, the arrangement 30 is provided with a fastening flag 40, which corresponds to the pocket 39. The attachment flag can be formed, for example, by a piping flag of a piping, by means of which a light guide is encased. When producing the decorative element 1, which has the arrangement 30, the fastening flag 40 is placed in the pocket 39 and fastened there, in this case by pouring the filling material 27 around the fastening flag 40, i.e. by filling the through-opening 8 of the decorative cut-out 2. In the process, part of the filling material 27 penetrates into the pocket 39 and consequently surrounds the fastening flag 40. Alternatively or additionally, it is conceivable to embroider or sew the arrangement 30 onto the decorative cut-out 2 and/or onto the functional layer 3, to weld it on, to glue it on (with a different/additional adhesive than the filling material 27) and/or other suitable force-, form- and/or material-locking connection or fastening methods.

Figure 6:
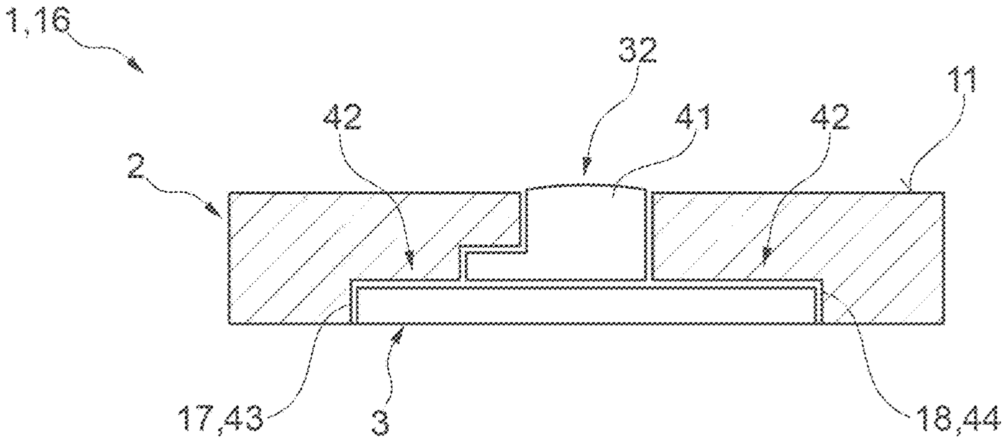
FIG. 6 is a schematic and sectional view of the decorative element with a lighting device according to the present disclosure.
Figure 7:
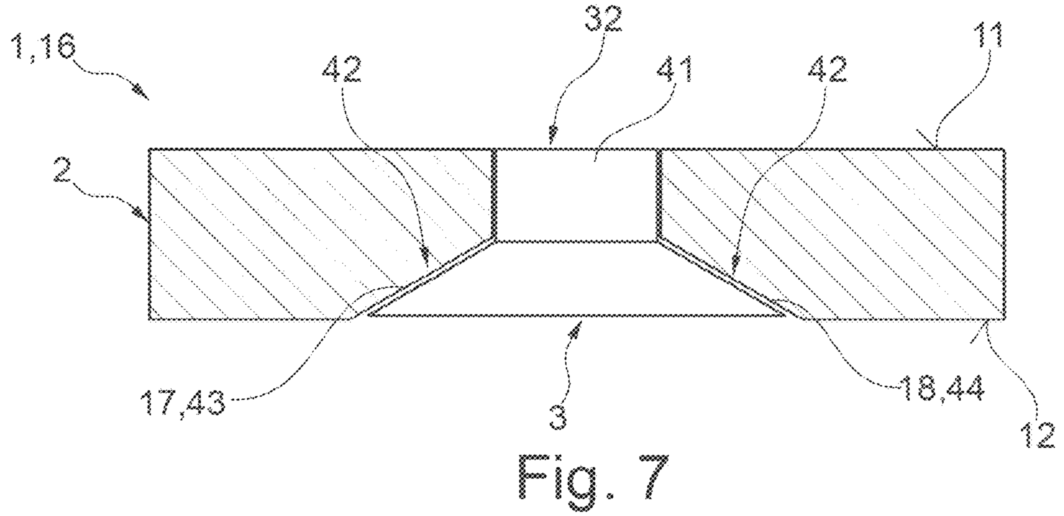
FIG. 7 is a schematic and sectional view of the decorative element with the light device in another possible example according to the present disclosure.

FIG. 6 and FIG. 7 each show a schematic and sectional view of the decorative element 1 with the light device 32, which in the present case comprises a light guide 41 that is embedded in the decorative element 1, i.e. in the decorative cut-out 2 and/or in the functional layer 3. It can be seen that, for example, one of the edges 17, 18 or both edges 17, 18 of the decorative cut-out 2 or of the cut material portions 4, 5 have a single-stage or multi-stage cut-out 42, by means of which the light guide 41 is held in position. Alternatively or additionally, the respective annular gap 21, 22 can have the cut-out 42 on its annular gap edges 43, 44. The light device 32, in particular its light guide 41, is held in the cut-out 42 in that the light guide 41 is at least partially arranged in the cut-out 42 and is secured against movement (force-, form- and/or material-locking). According to the example shown in FIG. 6, the functional layer 3 is embedded in the decorative cut-out 2, for example held in the cut-outs 42. It is provided that the functional coating 3 is formed by a textile.

As a further example and to illustrate that the geometry of the light guide 41 can be freely selected, a further design option is shown in FIG. 7, wherein the decorative cut-out 2 has the cut-outs 42 in an oblique form. The functional layer 3 is formed with oblique edges.

Figure 8:
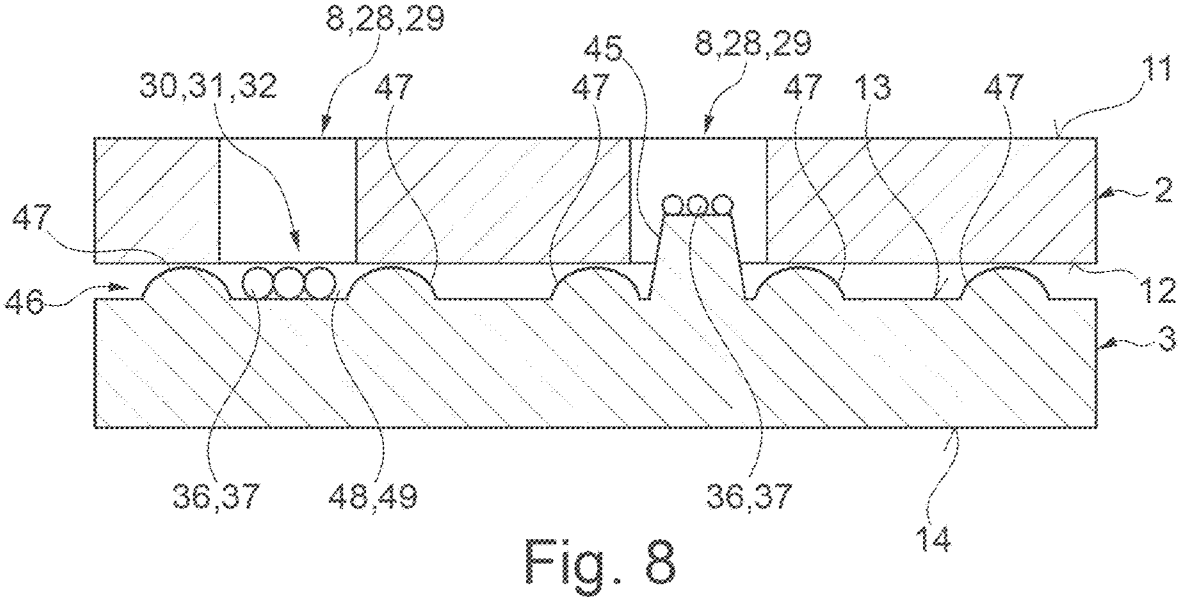
FIG. 8 is a schematic and sectional view of the decorative element, wherein a spacer device is formed between the decorative cut and the functional layer according to the present disclosure.

A schematic and sectional view of the decorative element 1 is shown in FIG. 8, wherein a spacer device 46 with at least one spacer element 47 is formed or attached between the decorative cut-out 2 and the functional layer 3. By means of the spacer elements 47 of the spacer device 46, the fastening sides 12, 13 and consequently the decorative cut-out 2 and the functional layer 3 are spaced apart from one another by a distance 48. The distance 48 provides a construction space 49 between the decorative cut-out 2 and the functional layer 3, which in the present example is used to accommodate elements of the electronic arrangement 30 between the decorative cut-out 2 and the functional layer 3. It is shown in FIG. 8 merely as an example that the heating or air conditioning device 31 and/or lighting device 32 (in each case in whole or in part) can be used in the construction space 49 created or kept free by the distance 48. For example, one of the lighting means 36 and/or one of the heating or air conditioning means 37—i.e. a light guide element (in particular the light guide 41), the heating wire, the air flow channel, a conductor track printed on the functional layer, etc.—can be accommodated in the construction space 49.

In FIG. 8, a holding element 45 is also shown, which projects into one of the through holes 8 and in this case is formed in one piece with the functional coating 3. Alternatively, the holding element 45 can be formed separately from the functional layer 3 and arranged on/at the functional layer 3. It can be seen that the holding element 45 is immersed in the through hole 8 or in the functional opening 28. The electronic arrangement 30 is at least partially arranged on an upper side of the holding element 45, in this case by arranging a lighting means 36 and/or a heating or air conditioning means 37 on/at the upper side.

Overall, the present disclosure is evident in the method for producing the decorative element 1 and through the decorative element 1 itself a respective possibility of how the—in particular multifunctional—decorative element 1 can be produced in a particularly simple or efficient manner, wherein it has at least one functional opening, namely at least one functional opening 28. The decorative element 1 is air-gap-free and offers a significant expansion of the design freedom with regard to a highly integrated and contemporary interior design in the automotive sector. Functions, light representations and light scenarios directly on a surface or visible side of the interior decor according to "Digitalization 4.0" offer a particularly advantageous increase in safety and user-friendliness.

The method and the decorative element enable design freedom for particularly flexible or versatile decorative element concepts with regard to layering arrangements and the introduction of functionalities, in particular multifunctionalities. The individual layers of the decorative element, for example different decorations, number of functional layers and their porosity and mechanical properties, and a number and positional arrangement of the through holes can advantageously be freely combined with one another. An arrangement of openings that are concealed, at least partially not visible from the outside and/or arranged so as to overlap one another (particularly when stacking several functional layers) can also be incorporated into such a combination. Furthermore, variants of the electrical/electronic arrangement, for example sensors, light, light guides, etc., can be added particularly easily to such a combination.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for producing a decorative element for a motor vehicle having a functional opening, the method comprising:

providing a decorative cut-out, the decorative cut-out including a through hole;

providing a functional layer that is fluid-permeable;

producing a composite including the decorative cut-out and the functional layer by fixing the decorative cut-out to the functional layer using an attachment side of the decorative cut-out; and filling the through hole of the decorative cut-out with a filling material to form the functional opening, the filling including introducing the filling material from a back of the functional layer to oversaturate the functional layer such that the filling material flows through the functional layer toward a visible side of the decorative cut-out and enters the through hole.

2. The method according to claim 1, further comprising: forming a decorative blank from a first blank material portion and a second blank material portion, wherein the through hole is formed by a gap between the first blank material portion and the second blank material portion.

3. The method according to claim 2, further comprising cutting the through hole into the first blank material portion such that the through hole corresponds to the second blank material portion, and inserting the second blank material portion into the through hole so that the through hole is partially filled by the second blank material portion.

4. The method according to claim 1, wherein the filling material is translucent in a final state.

5. The method according to claim 4, wherein the filling material is image-true transparent in the final state.

6. The method according to claim 1, further comprising producing a material-locking connection between the decorative cut-out and the functional layer by filling the through hole with the filling material.

7. The method according to claim 1, wherein the functional layer includes a first functional layer and at least one second functional layer, and the producing the composite further comprises fixing the first functional layer and the at least one second functional layer to the decorative cut-out.

8. The method according to claim 1, further comprising fastening at least one of an electrical arrangement and an electronic arrangement of the decorative element in a carrier region of the functional layer corresponding to the through hole of the decorative cut-out.

9. The method according to claim 1, further comprising at least partially removing the functional layer from the decorative cut-out after the through hole has been filled.

10. The method according to claim 1, further comprising cutting a second through hole into the functional layer, and the second through hole corresponds to the through hole of the decorative cut-out.

11. The method according to claim 1, wherein the functional layer is at least partially translucent.

12. The method according to claim 1, wherein the functional layer is image-true transparent.

13. The method according to claim 1, further comprising forming a fastening element for at least one of an electrical apparatus and an electronic apparatus of the decorative element on the attachment side of the decorative cut-out.

14. The method according to claim 1, further comprising providing a spacing device between a fastening side of the functional layer and a fastening side of the decorative cut-out to space the decorative cut-out and the functional layer apart from one another by a distance.

15. The method according to claim 1, further comprising providing a holding element arranged on an attachment side of the functional layer, the holding element dips into the through hole of the decorative cut-out, and holding at least one of an electrical arrangement and an electronic arrangement of the decorative element in the through hole by the holding element.

16. A decorative element for a motor vehicle, the decorative element is produced by the method according to claim 1.

* * * * *